United States Patent [19]

Lindsay et al.

[11] Patent Number: 5,040,178
[45] Date of Patent: Aug. 13, 1991

[54] METHOD OF FAULT PROTECTION FOR A MICROCOMPUTER SYSTEM

[75] Inventors: Michael R. Lindsay, New Hudson; Hemang S. Mehta, Sterling Heights, both of Mich.

[73] Assignee: Chrysler Corporation, Highland Park, Mich.

[21] Appl. No.: 351,354

[22] Filed: May 12, 1989

[51] Int. Cl.[5] .............................................. G11C 29/00
[52] U.S. Cl. .................................. 371/21.5; 371/16.1; 371/25.1
[58] Field of Search ...................... 371/21.5, 16.1, 25.1

[56] References Cited

U.S. PATENT DOCUMENTS

| | | | |
|---|---|---|---|
| 4,354,251 | 10/1982 | Hellwig et al. | 371/21.5 |
| 4,488,300 | 12/1984 | Horey et al. | 371/21.5 |
| 4,644,541 | 2/1987 | Linkowski | 371/21.5 |
| 4,646,307 | 2/1987 | Nishimura | 371/21.5 |
| 4,807,186 | 2/1989 | Ohmishi et al. | 371/21.5 |

Primary Examiner—Jerry Smith
Assistant Examiner—Phung M. Chung
Attorney, Agent, or Firm—Mark P. Calcaterra

[57] ABSTRACT

The present invention is a method of fault protection for a microcomputer system. The method determines whether the system returns to a normal or special operating mode if a fault is detected by determining the microprocessor's past history before the fault occurred thereby allowing the microprocessor to get back on track in an appropriate manner.

3 Claims, 3 Drawing Sheets

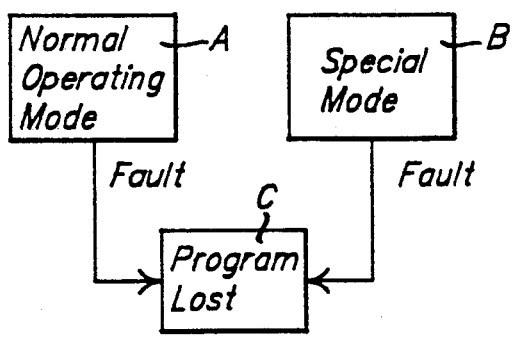
FIG. 1.
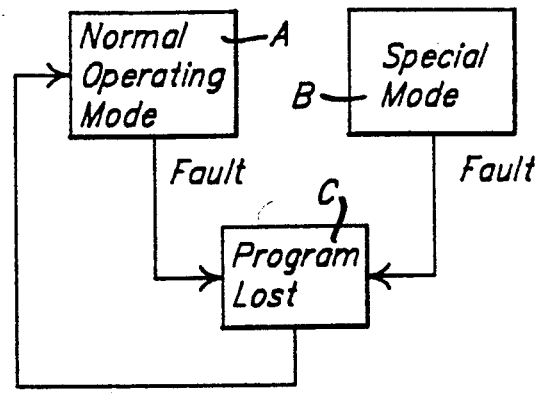
FIG. 2A.
FIG. 2B.
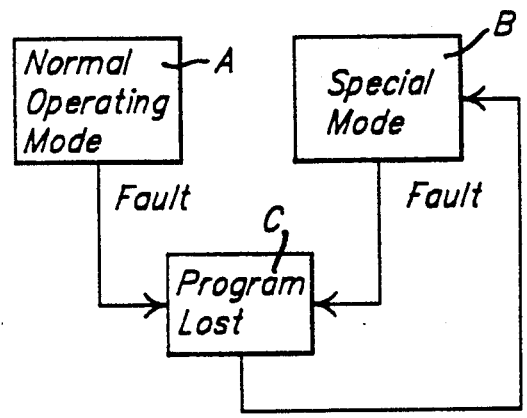
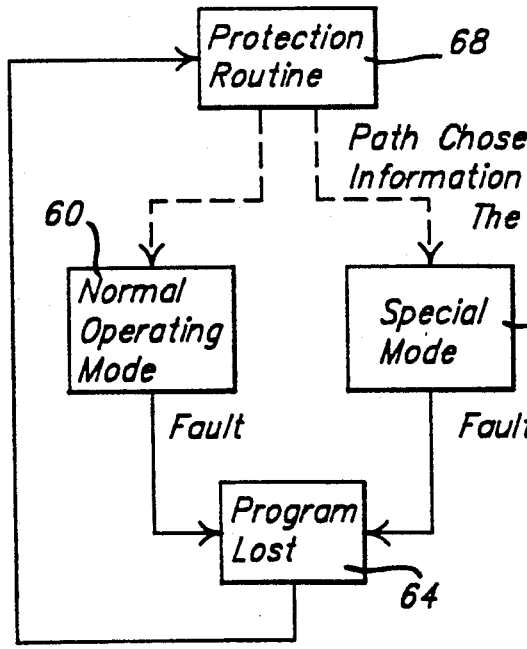
FIG. 3.

METHOD OF FAULT PROTECTION FOR A MICROCOMPUTER SYSTEM

BACKGROUND OF THE INVENTION

1. Field of the Invention

The present invention relates generally to a microcomputer system, and more particularly to, a method of fault protection for a microprocessor in a microcomputer system.

2. Description of Related Art

Typically, microcomputer systems include a microprocessor to control elements. The microprocessor, operating normally, executes instructions in an intended sequence. If something causes the microprocessor to execute instructions in a sequence different than what is intended by software (program) definition, a "fault" has occurred. When a fault occurs, the program gets off track and may cause the microprocessor to perform operations that are undesirable. Therefore, a need exists to get the program back on track and within a predetermined time period. This predetermined time period must be less than the time it takes for an undesirable result to occur based on the unintended operation.

Referring to FIG. 1, a microcomputer system having no system protection devices (system protection devices such as the computer operating properly (COP) watchdog system, illegal OPCODE detection circuit, and software interrupt found on the Motorola (68HC11 microprocessor) has a normal operating mode and a special mode in blocks A and B, respectively, is shown. The special operating mode is entered when the program operating in the normal mode determines that it is not proper or safe to continue the normal mode of operation. If the program gets off track due to a fault, it advances to a program lost block C where the microprocessor may operate indefinitely in an unintended manner. As a result, it would take a power-on or external microprocessor reset to put the program back to a known starting point.

Referring to FIGS. 2A and 2B, a microcomputer system having system protection devices only with normal operating and special modes in blocks A and B, respectively, is shown. If the program gets off track due to a fault, it advances to the program lost mode in block C. The system protection device will sense this and cause the program to stop its unintended operation and start from a known point such as block A in FIG. 2A or block B in FIG. 2B. A technique is needed for determining what path to take from the program lost mode in block C point, since it may not be appropriate for the program to go back to normal operation. If this is the case, when a fault is detected, the microprocessor must be put into the special mode of operation.

3. Objects of the Present Invention

It is, therefore, one object of the present invention to provide a method of fault protection to enable the microprocessor to get back on track in a proper manner without being put into a special mode of operation.

It is another object of the present invention to determine the microprocessor's past history of operation (before the fault) in order to select the proper or most desirable path for the program to take after the fault has occurred.

SUMMARY OF THE INVENTION

To achieve the foregoing objects, the present invention provides a method for fault protection for a microcomputer system. The microcomputer system includes a microprocessor with a Computer Operating Properly (COP) watch dog system, an illegal OPCODE trap interrupt, and a software interrupt (SWI) instruction to help protect against faults. The present invention provides that the recovery from a fault is appropriate by determining the microprocessor's past history before the fault occurred. As a result, the present invention enables the microprocessor to get back on track in an appropriate manner.

Other objects, features and advantages of the present invention will become more fully apparent from the following description of the preferred embodiment, the appended claims and in the accompanying drawings.

BRIEF DESCRIPTION OF THE DRAWINGS

FIG. 1 is a schematic view of a microcomputer system having no system protection devices.

FIGS. 2A and 2B are schematic views of a microcomputer system having system protection devices.

FIG. 6 is an overall flow chart of the microcomputer system of FIG. 3 incorporating the present invention of FIG. 5.

DESCRIPTION OF THE PREFERRED EMBODIMENT

Figure 3:
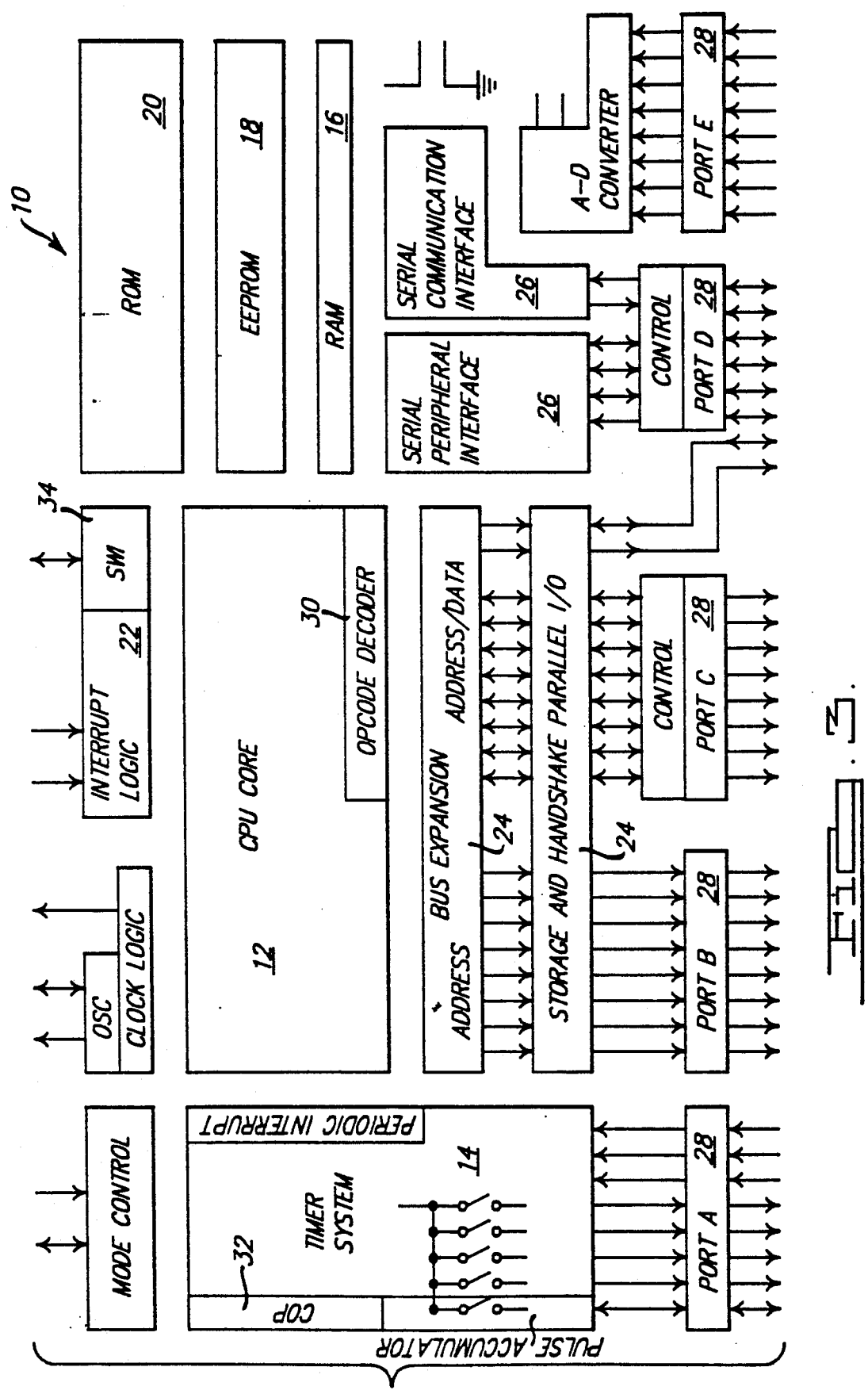
FIG. 3 is a schematic view of a microcomputer system for use with the present invention.

Referring to FIG. 3, a microcomputer system 10 is shown for use with the fault protection methodology according to the present invention. The microcomputer system 10 includes a central processing unit (CPU) or microprocessor 12 and a timer 14. Such a microprocessor 12 may be a Motorola 68HC11 microprocessor. The microcomputer system 10 also includes random access memory (RAM) 16, EEPROM 18, and read only memory (ROM) 20. The microcomputer system 10 further includes interrupt logic 22, buses 24, interfaces 26 and ports 28 for electrical connection to elements (not shown) that are controlled by the microcomputer system 10. It should be appreciated that the above components of the microcomputer system 10 are electrically connected to one another in a known manner. It should also be appreciated that the above components of the microcomputer system 10 are conventional and known in the art.

The microprocessor 12 includes an illegal OPCODE detection circuit 30 for detecting illegal OPCODES and providing a non-maskable interrupt if an illegal OPCODE is detected. The timer 14 includes a computer operating properly (COP) watchdog 32 to protect against software or program failures as well as any other fault which causes the program to go off track. The COP function includes predetermined control bits which permit specification of one of four time out periods and allows the function to be enabled or disabled. The COP watchdog 32 has a separate reset vector. The interrupt logic circuit 22 includes a software interrupt (SWI) 34. The SWI instruction sets the I bit, stacks the microprocessor registers (not shown), etc. It should be appreciated that the illegal OPCODE detection circuit 30 and SWI 34 are used as system protection devices although they may have other uses depending on the application.

Figure 4:
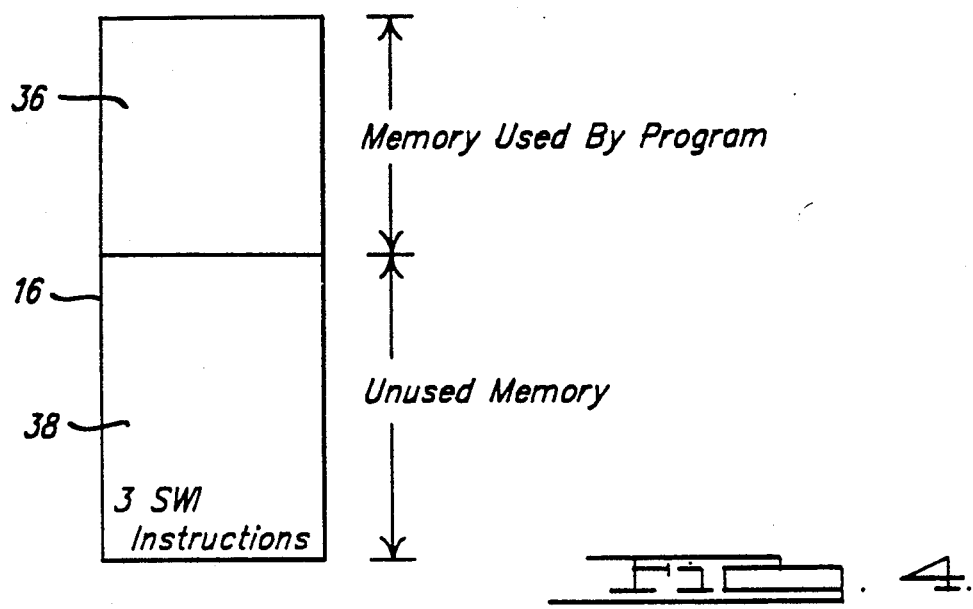
FIG. 4 is a schematic view of the memory of the microcomputer system containing the software program.

Referring to FIG. 4, a schematic view of the program memory is shown. This could be memory internal to the microprocessor or an external memory device. The memory has a first portion 36 which is used by the program. The memory also has a second portion 38 which is unused by the program and is filled with a begin OPCODE. At the end of the second portion 38 are a plurality of and preferably three SWI instructions. If the microprocessor 12 goes off track into the second portion 38, begin instructions are executed until the SWI instructions are encountered. When the microprocessor 12 executes an SWI instruction, it will be vectored to the fault protection methodology of FIG. 5 to be described.

Once the program is put back on track by system protection device, it must be determined where the program was when it went off track. If the program was in the initialization mode before some key failsafe checks had been made, it may not be safe to go to a normal operating mode. It may not be possible to perform these checks at this point because of constraints placed by the system.

If the program was in a special mode because a failure had been detected, then it must go back to the special mode and not allow normal operation. If the program was in a normal operating mode at the time of the fault, then it is safe to re-enter this mode.

The problem is having enough information available at the time the program is put back on track to determine which mode of operation the program was in before the fault. The contents of the RAM is not by itself a reliable source of information since the "lost" program may have written into any or all of the RAM locations.

By keeping a checksum of the contents of a designated block of keep alive RAM 16, it is possible to determine if any of these RAM locations were modified. This is done by computing the checksum of the RAM bytes and comparing this value to the value previously stored. If the values agree, the RAM was not modified and can be used to obtain information about where the program was at the time of the fault. If these values disagree, the RAM was modified and it cannot be used to determine the previous mode of operation.

One of the bytes in this checksummed area of RAM is called the special or shutdown code register (SDCREG). This register indicates the mode of operation the program is in at any given time so that the fault protection methodology can use this information to determine which path the program or program should take after the fault.

Under normal operation, SDCREG contains a hexidecimal code $00. If a fault occurs and the program counter is vectored to the fault protection methodology, the $00 in SDCREG indicates the program was in the normal operating mode before the fault occurred and after additional initialization is performed, the program may go back to or re-enter the normal operating mode. If during normal operation the program detects a failure, for example, the microprocessor 12 enters the special mode and stores a special or shutdown code (SDCODE=$AA) into SDCREG. If a fault occurs and the program is vectored to the fault protection methodology, the $AA in SDCREG indicates that the program was in the special mode before the fault and that it is not proper to go back or re-enter the normal operating mode. Instead, any additional initialization is performed and the program must re-enter the special mode. It should be noted that $00 and $AA codes are used here as an example but could be any code.

Figure 5:
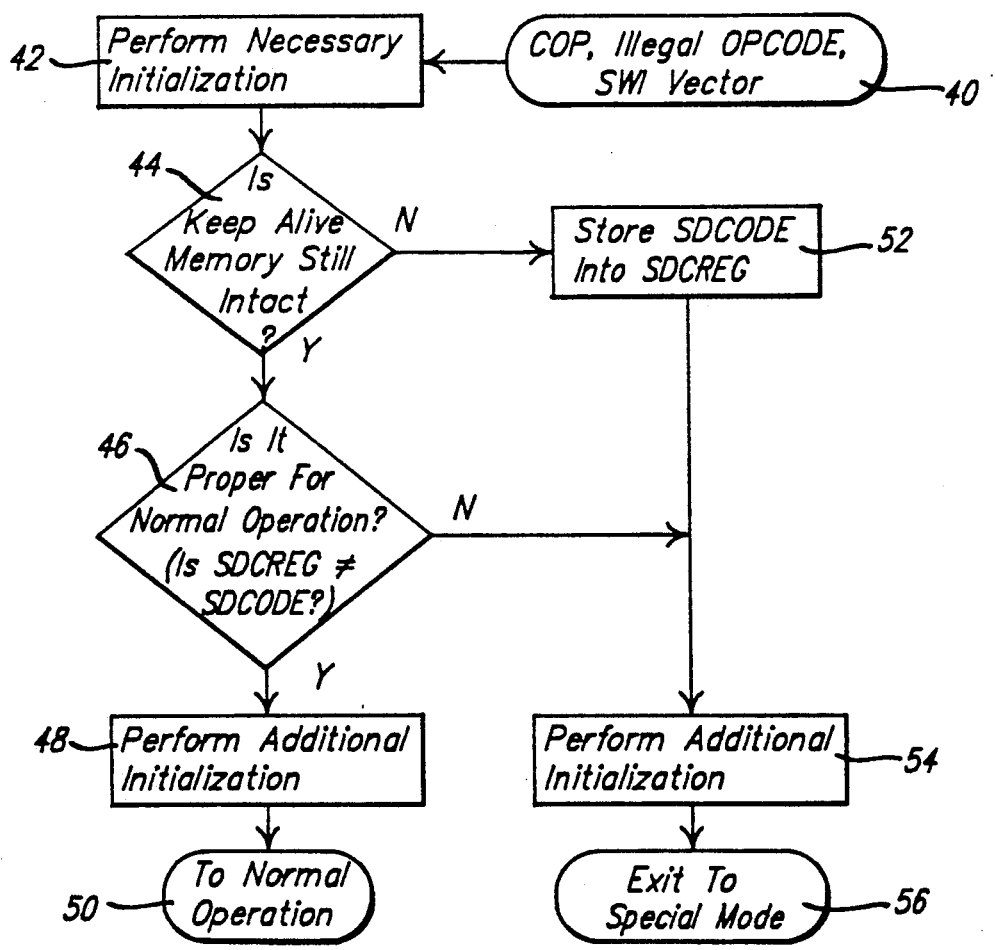
FIG. 5 is a detailed flow chart illustrating the fault protection methodology according to the present invention for the microcomputer system of FIG. 3.

Referring to FIG. 5, the fault protection methodology according to the present invention is shown. A fault is defined as anything that causes the microprocessor 12 to behave differently than what is intended by software or program definition. The microprocessor 12 recovers from a fault when the computer operating properly (COP) watchdog 32 forces a reset or when an illegal OPCODE or SWI instruction is executed. Preferably, three SWI instructions are placed at the end of each block of unused program memory to catch a runaway program. The microprocessor program counter (not shown) is vectored to the fault protection methodology.

The methodology begins in bubble 40 when a COP vector, illegal OPCODE vector or SWI vector is received by the microprocessor 12. The methodology advances to block 42 and performs any necessary initialization such as inhibiting interrupts, initializing a stack pointer, resetting the COP timer, initializing control register, etc. The methodology then advances to diamond 44 and checks whether the keep alive memory is intact by computing a RAM checksum value of a designated block of RAM 16 and comparing it to a previously computed and stored or predetermined checksum value. The keep alive memory along with a register designated as the special or shutdown code register (SDCREG) are the key to knowing if it is proper to continue normal operation. The shutdown code register is located in the RAM 16 and indicates to the fault protection methodology whether normal operating control is proper or not.

In diamond 44, the methodology determines whether the keep alive memory is still intact as checked. If the checksum values do match, the keep alive memory is still intact. The methodology then advances to diamond 46 and determines whether it is proper for normal operation by the SDCREG not equalling a special or shutdown code SDCODE. If the SDCODE does not equal the SDCREG, the methodology advances to block 48 and performs any additional initialization. The methodology then advances to bubble 50 and returns or exits to normal operation, preferably at a common point in the main program or program.

In diamond 44, if the checksum values do not match, the keep alive memory is not intact. The methodology then advances to block 52 and stores SDCODE into SDCREG. The methodology then advances to block 54 and performs any additional initialization. The methodology then advances from block 54 to bubble 56 and exits or returns to a special operating mode. It should be appreciated that if the keep alive memory is not intact, then the microprocessor's past history is not known and the SDCREG cannot be looked at. In this case, it is not proper to continue normal control and the methodology enters a special mode. This guarantees that no software failsafe is bypassed.

Additionally, in diamond 46, if it is not proper for normal operation because the SDCREG equals SDCODE, the methodology advances to block 54 previously described.

Referring to FIG. 6, an overall flow chart of the microcomputer system 10 with system protection devices and the fault protection methodology of the present invention is shown. In blocks 60 and 62 are the normal operating and special modes, respectively. If a fault occurs, the program advances via paths 61 and 63 from blocks 60 and 62, respectively, to block 64 containing program lost. The program advances from block 64 via path 66 to block 68 containing the fault protection methodology according to the present invention. The fault protection methodology of FIG. 5 is performed and the microprocessor 12 follows either path 70 or 72 leading from block 68 to block 60 and 62, respectively. The path chosen by the microprocessor 12 is based on information stored before the fault. It should be appreciated that enough information must be available at the time the program is put back on track to determine which mode of operation the program was in before the fault. It should also be appreciated that the contents of the RAM is not by itself a reliable source of information since the "lost" program may have written into any or all of the RAM locations.

The present invention has been described in an illustrative manner. It is to be understood that the words are in the nature of words of description rather than of limitation.

Obviously, many modifications or variations of the present invention are possible in light of the above teachings. Therefore, within the scope of the appended claims, the present invention may be practiced otherwise than as specifically described.

What is claimed is:

1. In a microcomputer system including a microprocessor having an OPCODE decoder and internal control registers, a timer having a computer operating properly (COP) watchdog, interrupt logic circuit having a software interrupt (SWI), memory such as random access memory (RAM) and keep alive memory, communication busses and interfaces and ports for sending and receiving information from at least one external object, a normal operating mode and a special mode, a method of fault protection for detecting unintended microprocessor operation and determining whether the system enters the normal operating mode or a special mode as a result of a fault detected, said method comprising the steps of:

computing a value from data taken from a designated area of memory;

determining if keep alive memory is intact by comparing the computed value to a predetermined value;

determining that the keep alive memory is not intact if the computed value does not equal the predetermined value and returning the microprocessor to a special mode;

determining that the keep alive memory is intact if the computed value equals the predetermined value and returning the microprocessor to the normal operating mode; and determining whether the system can enter the normal operating mode by comparing a predetermined special code to that stored in a special designated register, if the keep alive memory is still intact.

2. A method as set forth in claim 1 including the steps of:

storing the predetermined special code into the special designated register if the keep alive memory is not intact.

3. In a microcomputer system including a microprocessor having an OPCODE decoder and internal control registers, a timer having a computer operating properly (COP) watchdog, interrupt logic circuit having a software interrupt (SWI), memory such as random access memory (RAM) and keep alive memory, communication busses and interfaces and ports for sending and receiving information from at least one external object, the system having a normal operating mode and special operating mode, a method of fault protection for detecting unintended microprocessor operation and determining whether the system returns to the normal operating mode or special mode as a result of a fault detected, said method comprising the steps of:

computing a value from data taken from a designated area of memory;

determining if keep alive memory is intact by comparing the computed value to a predetermined value;

determining that the keep alive memory is not intact if the computed value does not equal a predetermined value;

determining that the keep alive memory is intact if the computed value equals the predetermined value;

comparing a predetermined special code to that stored in a special designated register if the keep alive memory is still intact;

determining that the system can enter the normal operating mode if the contents of the special designated register does not equal the predetermined special code and returning the microprocessor to the normal operating mode; and storing predetermined special code into the special designated register if the keep alive memory is not intact and returning the microprocessor to the special mode.

* * * * *